United States Patent [19]
Bundy et al.

[11] 3,876,402
[45] Apr. 8, 1975

[54] APPARATUS FOR SEPARATING PARTICULATE MATTER FROM A GAS STREAM

[75] Inventors: Richard P. Bundy, Prairie Village, Kans.; Larry D. McConnell, Glasgow, Mo.; Stanley A. Reigel, Overland Park, Kans.

[73] Assignee: Standard Havens, Inc., Kansas City, Mo.

[22] Filed: Jan. 10, 1974

[21] Appl. No.: 432,320

Related U.S. Application Data

[62] Division of Ser. No. 292,927, Sept. 28, 1972.

[52] U.S. Cl. .............. 55/341; 55/379; 55/DIG. 26
[51] Int. Cl. ............................................ B01d 46/04
[58] Field of Search ............ 55/302, 341, 361, 374, 55/378, 379, 492, 498, 500, 501, DIG. 26

[56] References Cited
UNITED STATES PATENTS

| | | | |
|---|---|---|---|
| 3,167,415 | 1/1965 | Edwards | 55/302 |
| 3,377,783 | 4/1968 | Young | 55/302 |
| 3,538,687 | 11/1970 | Pausch | 55/302 X |

FOREIGN PATENTS OR APPLICATIONS

| | | | |
|---|---|---|---|
| 555,056 | 8/1943 | United Kingdom | 55/DIG. 26 |

OTHER PUBLICATIONS

The Pulseflo Dust Collector System, 7/71, p.2, Los Angeles, Calif., (1000 W. Ninth St.), 90015.

*Primary Examiner*—Frank W. Lutter
*Assistant Examiner*—David L. Lacey
*Attorney, Agent, or Firm*—Lowe, Kokjer, Kircher, Wharton & Bowman

[57] ABSTRACT

A reverse pulse baghouse equipped with a self-contained service chamber having ventilation control in which ambient cooling is induced by the exhaust fan of the baghouse. Within the dirty-air plenum, the bags are of progressively greater length toward the center of the baghouse in order to minimize particle re-entrainment and each bag is sealed against an integral collar of the tube sheet to prevent gas leakage. The hopper section, for funneling dust cake to a hinged, screw conveyor trough, is removably connected to the upper section of the baghouse and is so sized to invertably nest within the upper section during shipment.

1 Claim, 10 Drawing Figures

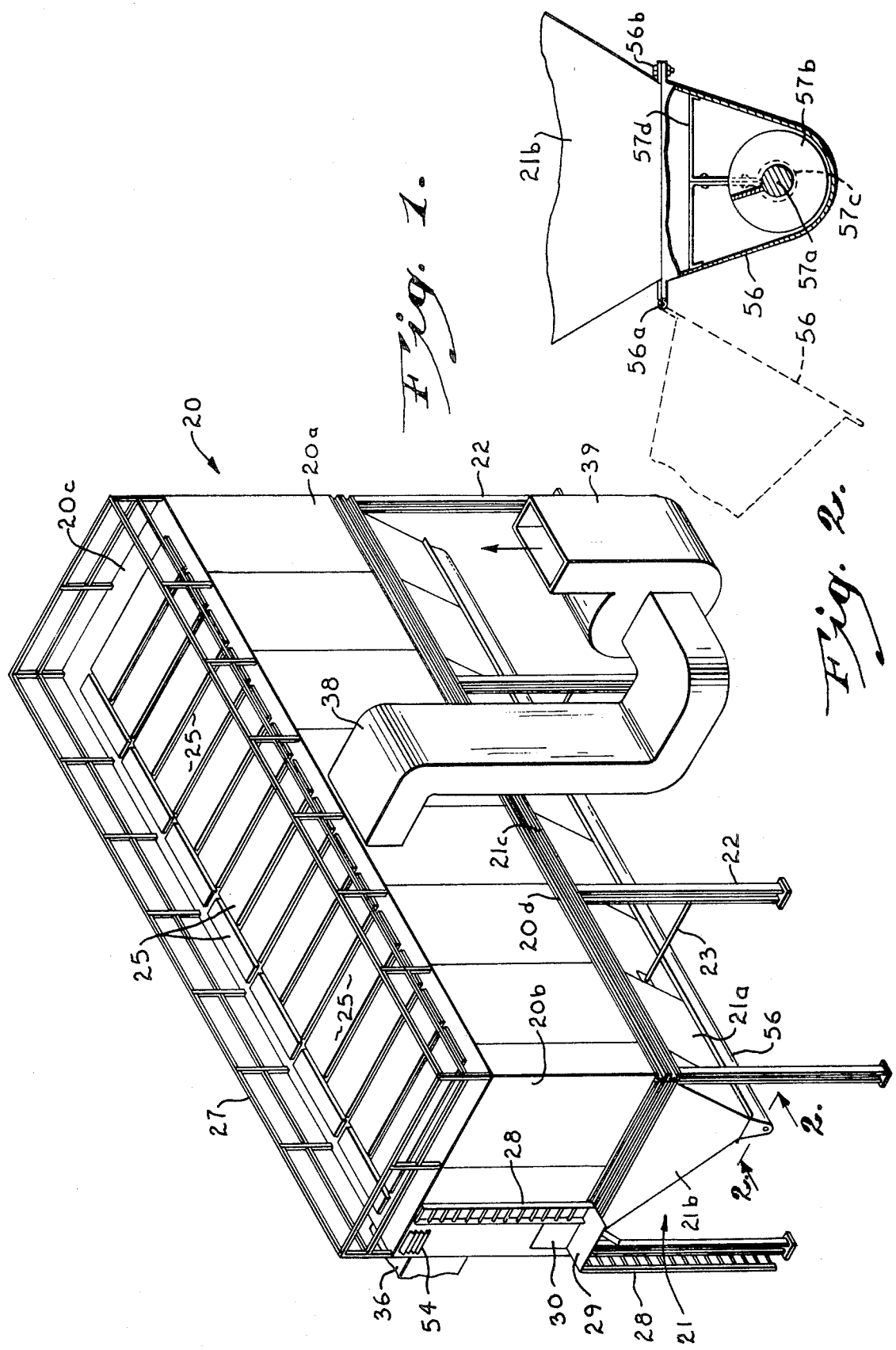

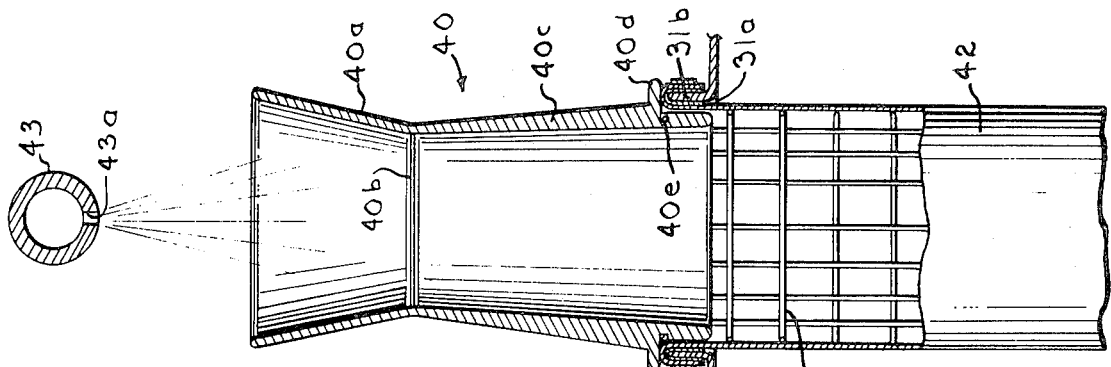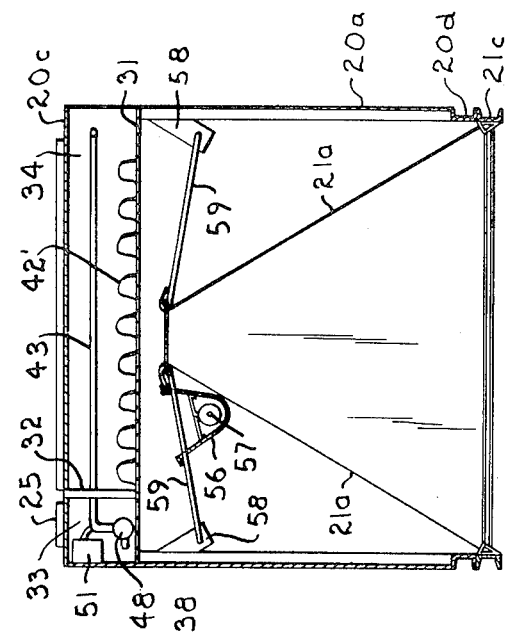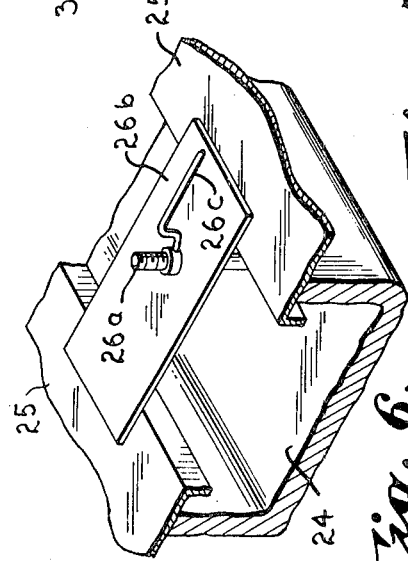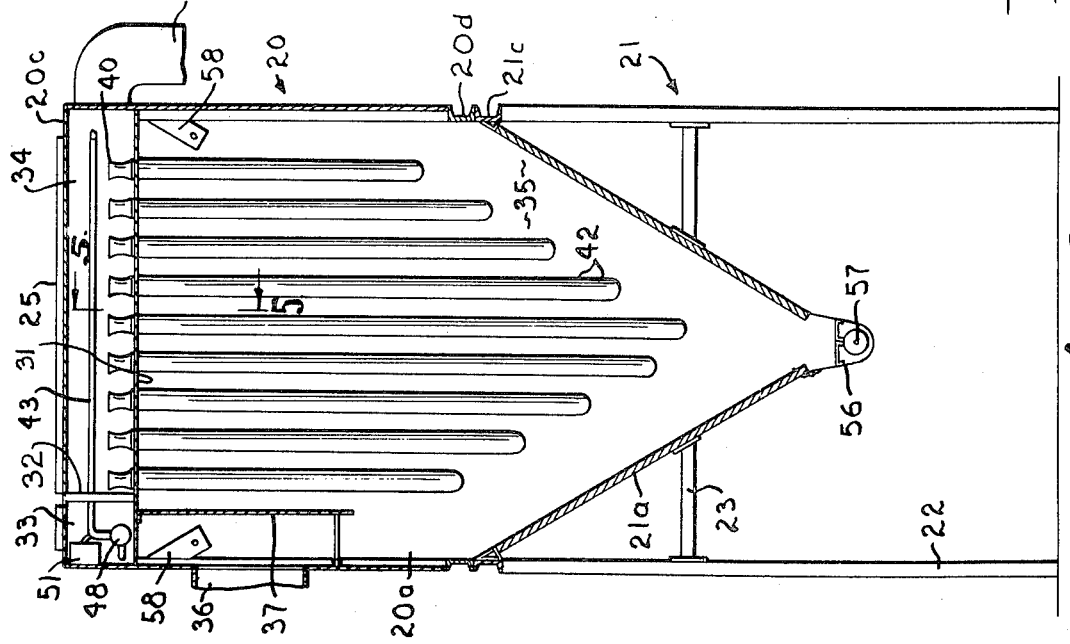

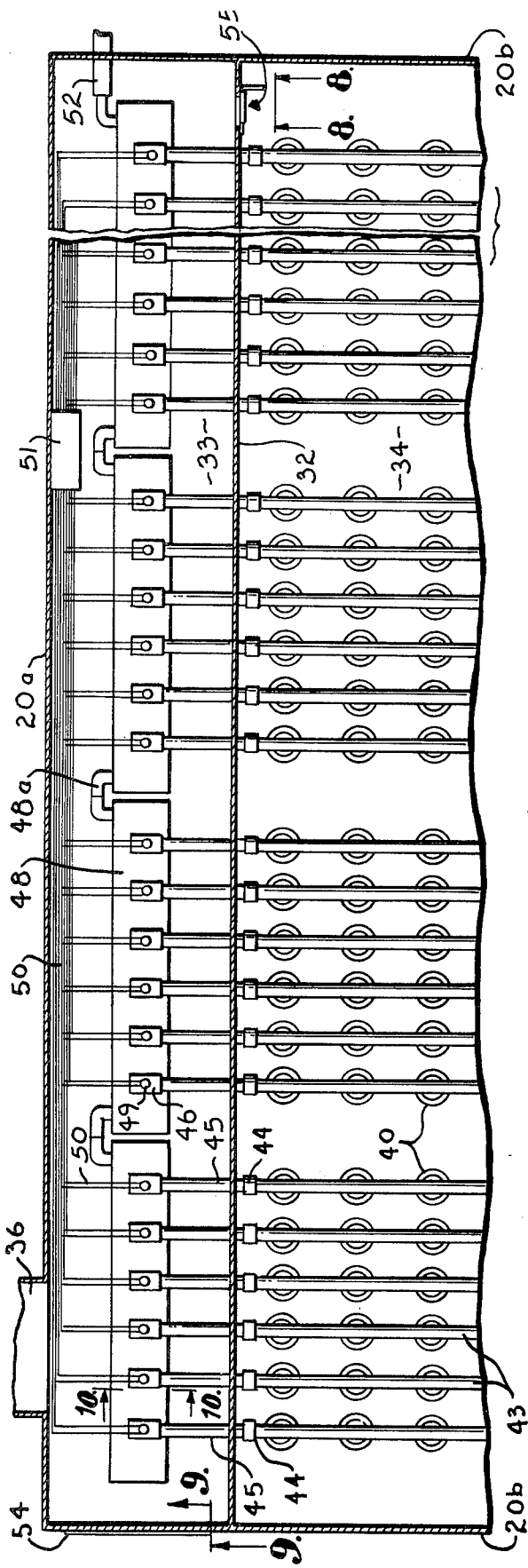
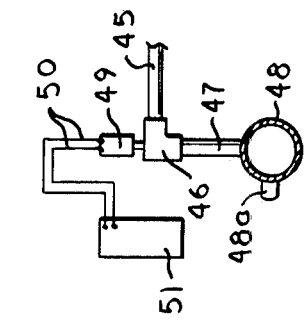
Fig. 10.
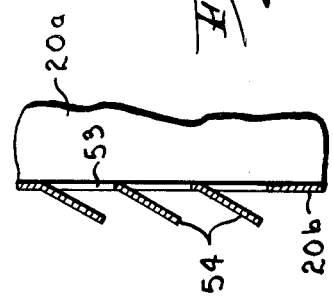
Fig. 9.
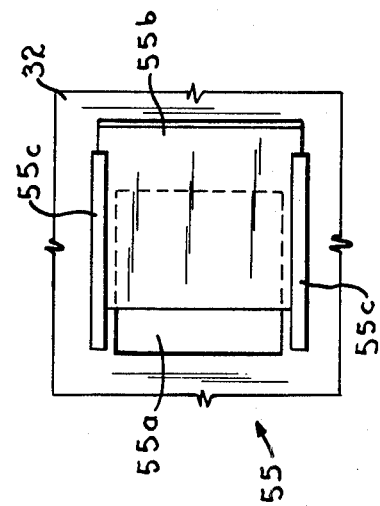
Fig. 7.
Fig. 8.

APPARATUS FOR SEPARATING PARTICULATE MATTER FROM A GAS STREAM

This is a division of application Ser. No. 292,927, filed Sept. 28, 1972.

BACKGROUND OF THE INVENTION

Recent emphasis on environmental quality has prompted the search for new and improved air pollution control methods. One technique for efficiently controlling air pollution to which this invention particularly relates has been the separation of unwanted particulate matter from a gas stream by fabric filtration.

The dust collection apparatus used to accomplish such particle separation is known in the trade as a "baghouse" and operates in a manner similar to an ordinary household vacuum cleaner, except on a much larger scale. Basically, the baghouse is a sheet metal housing divided into two chambers, referred to as plenums, by a tube sheet having a plurality of vertically suspended fabric tubes or bags in which cylindrical wire cages are inserted for skeletal support. A particle-laden gas stream, induced by the action of a fan, flows into the lower chamber (dirty-air plenum) wherein dust accumulates on the cloth bags as the gas passes through the fabric into the upper chamber (clean-air plenum) and out the exhaust. Continuous operation of the unit causes a cake of dust to build up on the outside of the bag which, unless removed, will reduce and eventually stop the flow of gas through the filter.

Several methods have been devised to remove the dust cake from the bags, including mechanically shaking the bags or pneumatically flexing the bag with a quick, jet blast of air. The latter method particularly relates to this invention and is accomplished by delivering a burst of compressed air into a venturi throat located in the clean-air plenum which directs the burst of air into the mouth of the bag, causing the bag to flex outwardly and dislodge the dust cake. Baghouses employing such a cleaning method are known as "reverse pulse baghouses." In operation, the bags are cleaned in rows or groups on a pre-selected cleaning cycle. The dislodged cake falls into the hopper and is removed from the baghouse by a screw conveyor.

In the past there have been several problems associated with the installation and operation of the reverse pulse type baghouses. Solenoid piloted diaphragm valves used to admit the compressed air pulse to the bags during the cleaning cycle have been subject to freezing, sticking and other malfunctions during winter operation. Since a solenoid valve is required for each row of bags, there is considerable time and expense associated with the installation of electrical connections to the valves because the electrical conductors must be enclosed by conduit or a similar encasement.

Another problem of some concern is associated with the pulse cleaning of the bags and involves the "re-entrainment" of the previously collected particulate matter as it falls from the bags toward the hopper section. This occurs because the small size (generally less than 50 microns) of the individual particles makes them subject to low terminal settling velocities and, therefore, low kinetic energy. The gas flow in the baghouse, on the other hand, is well into the turbulent regime (having a Reynolds number greater than 20,000) and eddies with turbulent flow characteristics re-entrain the low energy particles and re-deposit them on the bags. As a result of this action, efficiency of the baghouse is severely diminished.

Efficient baghouse operation has also been handicapped by gas leakage at either the connection between the cloth fabric and venturi or the seal between the venturi and the tube sheet. A satisfactory method of installing the bags, therefore, has not heretofore been known in the art.

Since baghouses are large and are fabricated from essentially flat metal sheets, the moment of inertia, section modulus, and other structural parameters of baghouses are exceedingly low. As a result of the inherently low structural integrity, baghouses are subject to damage during transit from the point of manufacture to job site caused by flexure and bending. Damage to the solenoids, valves, fittings, and connectors in the compressed air system for the cleaning cycle is an ever-present danger.

The screw conveyor employed to remove the dislodged dust cake from the hopper section of the baghouse has long presented a myriad of operational and maintenance problems. Because the conveyor is operated in a hostile environment, failure of bearings used for intermediate support of the conveyor is common due to the parts wear associated with immersed operation in an abrasive dust. Unusually high loadings of contaminated gas, or damp tacky dust, may result in material bridging over the bottom of the hopper section, thus blocking discharge of the material to the conveyor. The operational remedy quite obviously means shutdown of the unit for removal of the bridge material in order to prevent continuous buildup. The frequency and length of such maintenance shutdowns should be minimized for optimal operation.

SUMMARY OF THE INVENTION

The primary goal of this invention is to provide a reverse pulse baghouse of a reliable construction, possessing superior operational characteristics, and which is free of the maladies and drawbacks of baghouses heretofore found in the industry.

More particularly, an object of this invention is to provide a reverse pulse baghouse suitable for year round operation during inclement weather conditions. The design considerations, therefore, necessarily provide sufficient heat energy during winter operations in order to prevent freezing and sticking of the solenoid piloted diaphragm valves. At the same time, ventilation of the service components may be adjustably varied to provide induced ambient cooling during summertime operations.

Another object of the invention is to provide a reverse pulse baghouse wherein re-entrainment of particulate matter during the cleaning cycle is substantially minimized. Since the filtering media is not unnecessarily burdened with recycled dust, the operational efficiency is improved.

An additional object of the invention is to provide a reverse pulse baghouse in which leakage of contaminated gas into the clean-air plenum is held in check by means of an improved procedure for installing the bag-cage-venturi assemblies that virtually eliminates the possibility of contaminated gas bypassing the filter cloth.

A further object of the invention is to provide a reverse pulse baghouse which can be shipped to the job site without experiencing the damage normally incurred by baghouses in transit. Not only is the expense of replacing or repairing the damaged parts eliminated, erection at the job site may be quickly and conveniently accomplished.

With an improved baghouse of this character, operational malfunctions are virtually eliminated and maintenance requirements are severely diminished. In the event of tacky or damp dust causing bridging and build-up of the dust cake within the hopper section, another object of this invention is to provide a baghouse in which the screw conveyor may be speedily removed for unclogging the hopper section. Re-assembly after cleaning is also easily accomplished to insure that the downtime will be kept to an absolute minimum.

Other and further objects of the invention, together with the features of novelty appurtenant thereto, will appear in the course of the following description.

DESCRIPTION OF THE DRAWINGS

In the accompanying drawings, which form a part of the specification and are to be read in conjunction therewith, and in which like reference numerals are employed to indicate like parts in the various views:

FIG. 1 is a perspective view of a baghouse showing a preferred embodiment constructed in accordance with the principles of our invention;

FIG. 2 is an end view of the screw conveyor assembly shown connected to a fragmentary portion of the hopper section as taken generally along line 2—2 of FIG. 1 in the direction of the arrows, the broken line view indicating the trough swung away from its operative position;

FIG. 3 is an end elevational view taken through the baghouse to show the interior elements thereof;

FIG. 4 is an end elevational view of a baghouse, through the interior thereof, showing the structure assembled for transit;

FIG. 5 is an enlarged sectional view of a typical bag, cage and venturi assembly supported on the tube sheet beneath a compressed air jet, taken generally along line 5—5 of FIG. 3 in the direction of the arrows;

FIG. 6 is an enlarged, fragmentary perpsective view showing a typical hold-down assembly for the door members covering the roof of the baghouse;

FIG. 7 is a fragmentary plan view through the service chamber and a portion of the clean air plenum;

FIG. 8 is an enlarged, elevational view of the damper assembly through the wall separating the clean air plenum and service chamber, taken generally along line 8—8 of FIG. 7 in the direction of the arrows;

FIG. 9 is an enlarged sectional view of the service chamber ventilation duct, taken generally along line 9—9 of FIG. 7 in the direction of the arrows; and FIG. 10 is a sectional view through the compressed air header, showing a solenoid piloted diaphragm valve as taken generally along line 10—10 of FIG. 7 in the direction of the arrows.

Referring to the drawings in more detail, the baghouse basically comprises a sheet metal housing having an upper section 20, rectangular in shape and defined by side walls 20a, end walls 20b, and a roof structure 20c, surmounting a lower, hopper-shaped section 21, defined by sloped side walls 21a joined to side walls 20a and end walls 21b joined to end walls 20b, as shown in FIGS. 1 and 3. C-shaped channels 21c attached to the upper edges of the hopper 21 provide a margin with C-shaped channels 20d attached to the lower edges of walls 20a and 20b for removably connecting the upper section 20 and hopper section 21.

The housing is supported above the ground by a plurality of legs 22, which may include brace members 23 extending inwardly to engage the hopper section 21 for additional structural rigidity.

The roof 20c of the baghouse is constructed of a plurality of spaced, U-shaped channel members 24 which support a plurality of cover doors 25. As shown in FIG. 6, protruding upwardly from the channel 24 at various locations along the length thereof is a threaded shaft 26a which receives a hold-down plate 26b extending between and overlying adjacent cover doors 25. A tightening handle 26c having a threaded portion received by the shaft 26a urges the hold-down plate 26b to engagement with the cover doors 25 whereby removal of said doors 25 is prevented until the handle 26c is released and said hold-down members 26b are turned from their overlying relationship to the cover door 25.

Around the periphery of the housing at the roof level 20c extends a safety railing or fence 27, with access to the roof 20c being provided by a pair of ladders 28, separated by an intermediate service platform 29, as shown in FIG. 1. Adjacent the platform 29, a manway door 30 extends through the end wall 20b.

Interiorly of the baghouse, as shown in FIG. 3, a horizontally oriented tube sheet 31 is disposed within the upper section 20, extending between side walls 20a in width and between end walls 20b in length. A vertical partition 32 runs lengthwise of the baghouse between the roof level 20c and the tube sheet 31 to provide a service chamber 33, as shown in the upper left hand corner of the structure view in FIG. 3. In the same view, the chamber to the immediate right of the service chamber 33 is referred to as the clean-air plenum 34 and the region of the baghouse beneath the tube sheet 31 is referred to as the dirty-air plenum 35. The dirty-air plenum 35 is provided an opening in the side wall 20a equipped with an inlet conduit 36, which may be conventionally connected to additional plant equipment (not shown) for supplying dirty or contaminated gas to the baghouse. A baffle plate 37 is attached to the lower face of the tube sheet 31 and extends downwardly adjacent the inlet conduit 36 to diffuse the incoming gas.

An exhaust port is provided in the opposite side wall 20a in the clean-air plenum and is fitted with a conduit 38 for exhausting gas from the clean-air plenum 34. As shown in FIG. 1, a fan 39 may be operatively connected to the exhaust conduit 38 in order to pull gas through the baghouse. Alternatively, a fan may be connected prior to the inlet conduit 36 in order to push or blow gas through the baghouse in which case the exhaust conduit 38 would merely vent to the atmosphere.

Through the tube sheet 31 underlying the clean-air plenum 34 are a plurality of spaced, circular openings 31a which are arranged in parallel rows. Each opening 31a has, as shown in FIG. 5, an upwardly extending, circular collar 31b integral with the tube sheet 31.

Disposed within each such opening 31b is a bag-cage-venturi assembly, one of which is now to be described in detail with reference to FIG. 5. The venturi 40 comprises an upper frustoconical section 40a converging to a throat 40b and then a lower frusto-conical section 40c diverging from said throat 40b to the opening 31a. Toward the lower end of the venturi 40 is a peripheral shoulder 40d which overlies the circular collar 31b of the tube sheet. Just beneath the shoulder 40d is a circumferential groove 40e which supports a cylindrical cage 41 preferably fabricated from a wire mesh. Encasing the cage 41 is a cylindrical fabric sleeve 42, closed at the lower end, with the upper end being open and extending upwardly through the opening 31a in the tube sheet and folded over the collar 31b thereof and encircled by a clamping band 60.

In a direction inwardly from either side wall 20a, reference being made to FIG. 3, the bag 42 and cage 41 assembly of the character described is of increasingly greater length toward the center of the clean-air plenum 35 whereby the vertical distance from the lower end of the bag 42 to the sloped wall 21a of the hopper section 21 is substantially uniform for all bags 42.

Disposed within the clean-air plenum 35 and above each lateral row of bags 42 is a compressed air line 43 having a plurality of downwardly directed discharge openings 43a. One such opening 43a is concentrically aligned above each venturi 40 as shown in FIG. 5.

Each air line 43 is removably connected, via a coupling member 44, to a pipe 45 extending through the vertical partition 32 into the service chamber 33. As shown in FIG. 10, pipe 45 is connected to a diaphragm valve 46 which, in turn, is connected through a short extension 47 to a compressed air header 48. Opening and closing of the diaphragm valve 46 is controlled by a solenoid 49 mounted thereon having a pair of electrical leads 50 tied into a relay timer 51. The timer 51 is a conventional controller known to those in the art and operating to electrically trigger the solenoid 49 at a preselected time interval. Such a timer 51 may typically control thirty-six such solenoids 49.

The baghouse of the character described herein is of modular construction, as most particularly apparent in FIG. 7, to facilitate construction of a baghouse of sufficient size as required by the quantity flow of gas to be cleaned. In this regard, the compressed air header 48 is modularized, each header 48 feeding, for example, six compressed air lines 43 and successive headers 48 interconnected by elbow unions 48a. The end header 48 is connected by auxiliary piping 52 (a portion being shown) to the compressed air supply of the plant in which the baghouse is located.

In regard to the cover doors 25 as shown in FIG. 1, one such cover door 25 of the clean-air plenum 34 in this example is provided to cover every three rows of bags 42. The cover doors 25 over the service chamber 33, on the other hand, are longitudinally disposed over the service chamber to cover the service components corresponding to six rows.

With reference to FIG. 9, the service chamber 33 is vented to the atmosphere at one end thereof through end wall 20b, such opening 53 being shielded by a plurality of slanted louvers 54. Toward the end of the service chamber 33 opposite the louvered vent 53, is a damper assembly 55, as shown in FIGS. 7 and 8, installed in the partition 32 separating the service chamber 33 and clean-air plenum 34. The damper assembly 55 includes an opening 55a through the vertical partition 32, and a closure door 55b slidably received within channel members 55c located above and below the opening 55a. So constructed, the door 55b may be adjustably moved in the channel members 55c to vary the size of the exposed opening 55a through the service chamber 33 to the clean-air plenum 34.

Returning now to the lower portion of the baghouse, with particular reference to FIG. 2, an elongated conveyor trough 56 is connected along the lower edge of one slope side 21a of the hopper 21 by a hinge 56a and is removably secured to the opposite side 21a by a plurality of bolts 56b. Disposed within the trough 56 is a screw conveyor 57 comprising a rotatable shaft 57a on which is attached spirally wrapped flighting 57b. The shaft 57a is supported along the length thereof by bearings 57c mounted on hanger brackets 57d attached to the interior of the trough 56.

Attention is directed to FIG. 4 which illustrates the baghouse assembled for transit. The hopper section 21 is dimensionally sized to permit inverted nesting within the rectangular section 20, with the channels 21c in an inverted position being bolted to the channels 20d of the upper section 20. In height, the hopper section 21 is of lesser dimension than the vertical distance between the tube sheet 31 and the lower edge of the side walls 20a; it being necessary to swing the trough 56 and conveyor 57 away from the end of the hopper to provide clearance of the tube sheet 31. Bracket members 58 are fixedly secured to the interior surface of the side walls 20a to receive shipping restraints 59 connected to the converging edges of the hopper walls 21a. The venturis 40 and cages 41 are assembled and stored in any convenient location within the baghouse. The bags themselves are installed in the tube sheet 31 (i.e., fitted over collars 31b, and secured thereto by bands 60) but are then rolled up from the bottom, and the bag roll 42' is then stuffed through the openings 31a for storage in the clean-air plenum. Upon arrival at the job site, the shipping restraints 59 securing the hopper 21 within the upper rectangular section 20 are removed and the hopper 21 is unbolted from the side walls 20a, removed, inverted and again bolted to the side walls 20a. The structure may then be supported above the ground on support legs 22 or a similar foundation. The bag rolls 42' may be pushed down through the openings 31a in the tube sheet 31 so the bags 42 will then unroll their complete length into the dirty-air plenum 35. With the air lines 43 temporarily removed from their pipe sleeves of couplings 44, the cages and venturi assemblies are inserted into the bags 42 from above to complete the bag installation.

In operation, gas laden with dust is pulled, induced by the fan 39, into the dirty-air plenum 35 through the inlet conduit 36 which is connected through auxiliary conduits to the equipment within the plant generating the contaminated gas. After flowing around the baffle plate 37, contaminated gas passes through the fabric filter provided by the bags 42 and through the mesh of the cages 41, leaving particulates deposited on the outside of the bags 42. The clean gas then passes upwardly through the cages 41, up through the venturis 40, and into the clean-air plenum 34 from which it is exhausted through the exhaust conduit 38.

Continuous flow of contaminated gas through a bag 42 causes a layer or cake of dust to build up on the exterior surface of the bag which must be removed or it will reduce and eventually stop the flow of gas through the filter. The bags 42 are cleaned in rows or groups on a predetermined cleaning cycle controlled by the timer 51. When any specific row is to be cleaned an electrical signal from the timer 51 actuates the solenoid 49 to open the diaphragm valve 46 and admit compressed air from the header 48 into the extension 45 and air line 43. The compressed air is discharged downwardly through the openings 43a above the venturis 40 and causes an air blast to travel into the bag 42, flexing or bellowing the fabric from inside whereby causing the dust cake to fall from the bag 42 into the hopper section 21. The dust cake removed from the bag 42 travels down the hopper walls 21a into the screw conveyor 57 where it is discharged from one end of the trough 56 for disposal or subsequent use of the reclaimed dust as a mineral filler, soil conditioner, and the like. Accordingly, it is seen that with this method of continuous cleaning, at any selected time there will be some bags which have just been cleaned, with many rows with varying amounts of dust cake build-up, and some rows just about to be cleaned.

Inclement weather is of course no handicap to the proper operation of the solenoid piloted diaphram valves 46 housed within the service chamber 33. During colder weather, the door 55b of the damper assembly is normally closed so that no air is induced to flow through the service chamber 33. In this manner, sufficient heat is transferred from the dirty-air and clean-air plenums 35 and 34 into the service chamber 33 to prevent freezing and sticking of the solenoids 49 and valves 46.

During summertime operations, on the other hand, excessive heat conducted to the service chamber 33 from the clean-air and dirty-air plenums may quite likely have a damaging effect on the solenoid piloted diaphragm valves and electrical hardware. In this case, the sliding door 55b of the damper assembly is opened to provide a passage 55a from the service chamber 33 into the clean-air plenum 34. Suction of the exhaust fan 39 induces ambient air to flow through the louvered vent 53 at one end of the service chamber 33, through the entire length of the service chamber to thereby provide a cooling effect for the components therein and then pass through the damper opening 55a into the clean-air plenum 34. In the event a blower is used ahead of the baghouse in lieu of exhaust fan 39, it is necessary to install an auxiliary fan in the vent 53 in order to circulate air through the service chamber 33.

A further advantage of this service chamber construction is a substantial cost savings in the installation expenses and also in the maintenance expenses, because the great amount of electrical wiring 50 may be left exposed within the chamber 33 and is readily accessible for repairs through the cover doors 25 on the roof of the baghouse.

As previously mentioned, the cover doors 25 over the clean-air plenum 34 likewise provide access to that space for maintenance purposes. In the event it is necessary to replace a defective bag 42, the air line 43 is removed from the coupling 44 and the venturi 40 with attached cage 41 is removed from above. The defective bag can then be replaced and the venturi-cage assembly once again installed.

It should be noted that connecting the bag 42 directly to the tube sheet 31 by means of the collar 31b, rather than to a venturi as heretofore practiced, and then securing the fabric with a clamp 60 substantially eliminates leaks of contaminated gas into the clean-air plenum 34. In this manner, metal-to-metal joints, such as venturi to tube sheet, are interposed by the cloth to assist in effective sealing.

With respect to access into the interior of the baghouse, the dirty-air plenum 35 may be entered for maintenance or inspection through the manway 30 adjacent the service platform 29 as shown in FIG. 2.

In the event damp, tacky dust is delivered to the baghouse, usually caused by a lowering of the inlet gas temperature below the dew point of the gas, such operations may cause a bridging over of material in the bottom of the hopper section 21, thus blocking discharge of the dust cake to the screw conveyor 57. Cleaning may be easily accomplished simply by removing the bolts 56b coupling the trough 56 to the hopper flange and swinging the trough 56 to one side by hinge 56a for manual removal of the bridged material. Once clean, the trough 56 and screw conveyor 57 may be swung back into position and the attachment bolts 56b reinstalled, and operation of the baghouse resumed.

From the foregoing, it will be seen that this invention is one well adapted to attain all of the ends and objects hereinabove set forth, together with other advantages which are obvious and inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. In a reverse pulse baghouse having a dirty-air chamber and a clean-air chamber separated by a horizontally disposed tube sheet which has an upper surface adjacent the clean-air chamber and a lower surface adjacent the dirty-air chamber and which suspendingly supports a plurality of filtering assemblies each comprising a cylindrical fabric sleeve having an open end portion, an elongated tubular portion and a closed end portion, a cylindrical foraminous cage, and a venturi, a connection for mounting said filtering assembly to said tube sheet, said connection comprising:

a cylindrical collar integrally joined to said tube sheet to define a circular opening therethrough, the major portion of said sleeve being disposed within the dirty-air chamber with the upper end portion received through said circular opening and turned over said collar;

a clamping band encircling the collar and the sleeve turned thereover to securely bias said sleeve to said collar;

said cage connected to said venturi and being disposed within said fabric sleeve;

said venturi including a neck portion received within the upper end portion of said sleeve and said collar and a peripheral portion adjoining the upper end of said neck portion, and of greater diameter than the diameter of said circular opening to overlyingly rest upon said filter covered collar for support on said tube sheet.

* * * * *